US010684777B2

(12) United States Patent
Chambliss et al.

(10) Patent No.: US 10,684,777 B2
(45) Date of Patent: Jun. 16, 2020

(54) OPTIMIZING PERFORMANCE OF TIERED STORAGE

(71) Applicant: International Business Machines Corporation, Armonk, NY (US)

(72) Inventors: David D. Chambliss, Morgan Hill, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 14/746,905

(22) Filed: Jun. 23, 2015

(65) Prior Publication Data

US 2016/0378654 A1 Dec. 29, 2016

(51) Int. Cl.
*G06F 3/06* (2006.01)
*G06F 12/0811* (2016.01)

(52) U.S. Cl.
CPC ............ *G06F 3/061* (2013.01); *G06F 3/0649* (2013.01); *G06F 3/0685* (2013.01); *G06F 3/068* (2013.01); *G06F 12/0811* (2013.01); *G06F 2212/283* (2013.01)

(58) Field of Classification Search
CPC .... G06F 12/0811; G06F 3/068; G06F 3/0685; G06F 2212/283; G06F 3/061
USPC .................................................. 711/122, 103
See application file for complete search history.

(56) References Cited

U.S. PATENT DOCUMENTS

| | | | |
|---|---|---|---|
| 8,284,627 B2 | 10/2012 | Belluomini et al. | |
| 9,274,941 B1* | 3/2016 | Throop | G06F 3/06 |
| 2011/0276620 A1 | 11/2011 | Pirzada et al. | |
| 2011/0289287 A1* | 11/2011 | Yamamoto | G06F 3/0605 |
| | | | 711/156 |
| 2012/0023300 A1 | 1/2012 | Tremaine et al. | |
| 2012/0198152 A1 | 8/2012 | Terry et al. | |
| 2013/0111171 A1* | 5/2013 | Hirezaki | G06F 3/0605 |
| | | | 711/165 |
| 2013/0297873 A1 | 11/2013 | Hyde, II et al. | |
| 2013/0312005 A1 | 11/2013 | Chiu et al. | |
| 2014/0095827 A1* | 4/2014 | Wei | G06F 12/0246 |
| | | | 711/203 |

OTHER PUBLICATIONS

Lee et al., Benchmarking and Modeling Disk-based Storage Tiers for Practical Storage Design, Performance Evaluation Review, vol. 40, No. 2, Sep. 2012, pp. 113-118.
(Continued)

*Primary Examiner* — Shane D Woolwine
(74) *Attorney, Agent, or Firm* — Lieberman & Brandsdorfer, LLC

(57) ABSTRACT

Embodiments of the invention relate to a storage system organized into a hierarchy of storage tiers, with at least one tier reflecting a high performance tier and at least one tier reflecting a lower performance tier. The high performance tier has a capacity restriction and has a limited quantity of blocks and pages may be placed in the tier. Assessments are conducted and a preferred selection of blocks and pages are recommended for placement; the recommendation is based on the assessment. The recommendation is converted to an actual placement, resulting in placement of at least one block, an in one embodiment at least one page, in the high performance tier.

19 Claims, 7 Drawing Sheets

(56) References Cited

OTHER PUBLICATIONS

Anonymous, Smarter Information Lifecycle Management, An IP.com Prior Art Database Technical Disclosure, May 27, 2011, pp. 1-8.

Anonymous, A Method to Effectively Cool Temporal Data Providing Maximal ROI, An IP.com Prior Art Database Technical Disclosure, Mar. 21, 2011, pp. 1-5.

Lee et al., Measurement for Improving the Design of Commodity Archival Storage Tiers, 2011 Fourth IEEE International Conference on Utility and Cloud Computing, pp. 275-283.

Anonymous, A Storage Tiering Based Solution for Selection of LUNs in a Mirror-volume to Maximize High Availability, An IP.com Prior Art Databased Technical Disclosure, Oct. 15, 2010, pp. 1-6.

* cited by examiner

OPTIMIZING PERFORMANCE OF TIERED STORAGE

BACKGROUND

The present invention relates to a tiered storage system. More specifically, the invention relates to selection of blocks and pages for placement in the storage system.

A tiered storage system utilizes at least two types of storage devices in the form of computer equipment on which information can be stored. More specifically, a storage device is a hardware device used to record and store data files and objects. Forms of storage include, but are not limited to a solid state disk drive (SSD), and a hard disk drive (HDD). A SSD, also referred to as an electronic disk drive, is an electronic storage drive built on solid state architecture. More specifically, the SSD is built with flash memory to store non-volatile data and dynamic random access memory. The SSD is an entirely electronic storage device and its physical assembly contains no mechanical parts. The HDD employs a hard disk to storage data on a moving magnetically coated surface or surfaces.

The SSD is generally a faster and more expensive form of storage on a storage unit basis in comparison to the HDD. In a hierarchical organization of storage, different devices are placed in hierarchical tiers. For example, in a system with both a SSD and a HDD, the SSD is placed in one tier of the hierarchy, and the HDD is placed in a second tier of the hierarchy. Data is placed in a storage device in one of the tiers based on characteristics of the data, frequency of data access, and associated storage cost(s).

SUMMARY

The invention includes a method, computer program product and system for optimizing performance of a tiered storage system.

In one aspect, a method, system, and computer program product are provided for implementation of the storage optimization. More specifically, the storage system is configured into a hierarchy of storage tiers, which include at least two tiers of storage with one of the tiers reflecting a high performance storage tier and one of the tiers reflecting a lower performance storage tier. A maximum number of blocks and pages are determined for selection and placement into the high performance storage tier. In addition, a benefit metric is estimated for the selection. The benefit metric is a value of a given selection of blocks and pages for placement in the high performance storage tier. Based on the benefit metric, a preferred selection of blocks and pages is determined. The preferred selection is converted into actual placement in the high storage tier. The placement includes a selection of blocks and pages in the high storage tier, with the selection reflecting the preference as determined by the benefit metric.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
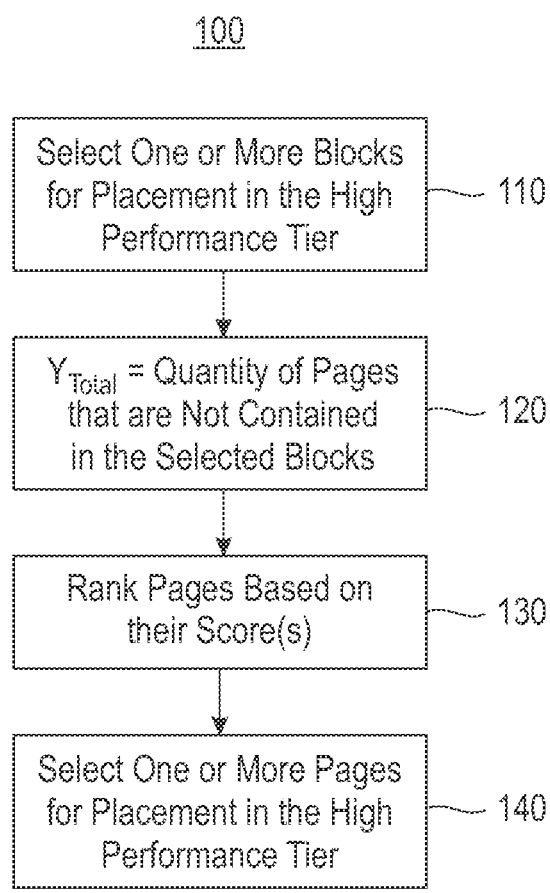
FIG. 1 depicts a flow chart illustrating a process for a preferred selection of blocks and pages in a high performance tier of the storage hierarchy.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Data stored in a data storage device is organized as pages, with each page having a uniform size, e.g. a fixed number of bytes, as recognized by the operating system. Multiple pages may be grouped into a block, with each block having a uniform size as recognized by the operating system. Organizing pages into blocks enables multiple pages to be manipulated as a unit. For example, a block of pages may be transferred as a unit. The larger the block size, the faster the data transfer rate. Accordingly, transfer of data is more efficient when carried out in blocks rather than individual pages. Additionally, if a block of pages is stored together then the metadata needed to define that storage placement is much smaller than the total bytes of metadata that would be needed to describe the individual storage placements of the pages if they were stored independently. It may not be feasible to accommodate the metadata that would result from placing all pages independently, and in such a case storing some pages as blocks makes operation feasible. Storing more pages as blocks can free up memory resources for other beneficial purposes such as content caching for improved performance or additional functionality.

The data storage system is configured as a hierarchy of storage tiers, with at least two tiers defined and organized as a higher performance tier and a lower performance tier. Pages of data are placed in one of the tiers of the hierarchy based on frequency of data access. More specifically, a value assigned to a page that reflects an associated frequency of access of the page. The value is referred to herein as a score. A page that has a relatively high frequency of access is assigned a relatively high score and is placed in the higher tier that accommodates frequent access. Conversely, a page that has a relatively low frequency of access is assigned a relatively low score and is placed in the lower tier that accommodates a less frequent access. In a storage hierarchy with an SSD and an HDD, the page with the relatively high score is placed in the SSD tier and the page with the relatively low score is placed in the HDD tier. It is generally desirable to increase the proportion of accesses that are directed to the higher tier and correspondingly to decrease the proportion directed to the lower tier, because the higher tier responds faster and the aggregate performance is improved. Placing pages with a high score, which are accessed more often, on the higher tier yields a performance improvement.

Challenges arise with blocks of pages and associated scores. A block contains at least two pages, and in one embodiment, the pages may be heterogeneous with respect to their scores, with at least one page having a relatively high score and another page having a relatively low score. At the same time, storage capacity is a constraint. In general, the higher performance tier is expensive and as such space in the higher tier is limited. As such, in one embodiment, the SSD storage will have a smaller capacity than the HDD. To address the limited capacity of the higher tier, a maximum number of blocks and pages for selection and placement in the higher tier must be determined. As shown and described in detail below, both of the tiers may receive a combination of blocks and pages, with the characteristic that generally a page contained in a block will not be redundantly placed in the tier as an individual page. Accordingly, storage of pages and blocks includes factors of storage capacity and frequency of access score(s).

A mathematical optimization is employed to model block and page selection, and more specifically, storage of the block(s) and page(s) in the tiers of the storage system. Parameters of the storage system and measurements of the data pages and blocks are employed as input parameters into the formulation of the optimization, and a solution is converted into an action that improves performance of the data access. The number of blocks selected for the high performance tier (SSD) is limited by the total capacity assigned to whole block placement. At the same time, the number of pages selected for the high performance tier (SSD) is limited by memory space available to hold an associated mapping of metadata for the pages mapped to the high performance tier. Once a page is selected for the high-performance tier as either a selected page or as a page contained in a selected block, there would be no further benefit to selecting it both ways, e.g. page and block. Accordingly, the optimal selection of pages must recognize which pages are already selected in blocks, and the optimal selection of blocks must recognize that some pages will be selected even when the associated blocks are not selected.

With reference to FIG. 1, a flow chart (100) is provided illustrating a process for a preferred selection of blocks and pages in a high performance tier of the storage hierarchy. One or more blocks are selected for placement in the high performance tier (110). Pages that are not contained in the selected blocks are identified and assigned to the quantity variable of $Y_{Total}$ (120). Individual pages may be scored or assigned a score based on various factors, as will be described below. The pages are ranked based on their score(s) (130). Based on available space in the high performance tier and the ranking of the pages at step (130), one or more pages are selected and placed in the high performance tier (140). Accordingly, the process of assigning blocks and pages to a storage tier is shown to consist of a block selection process followed by a page selection process.

Figure 2:
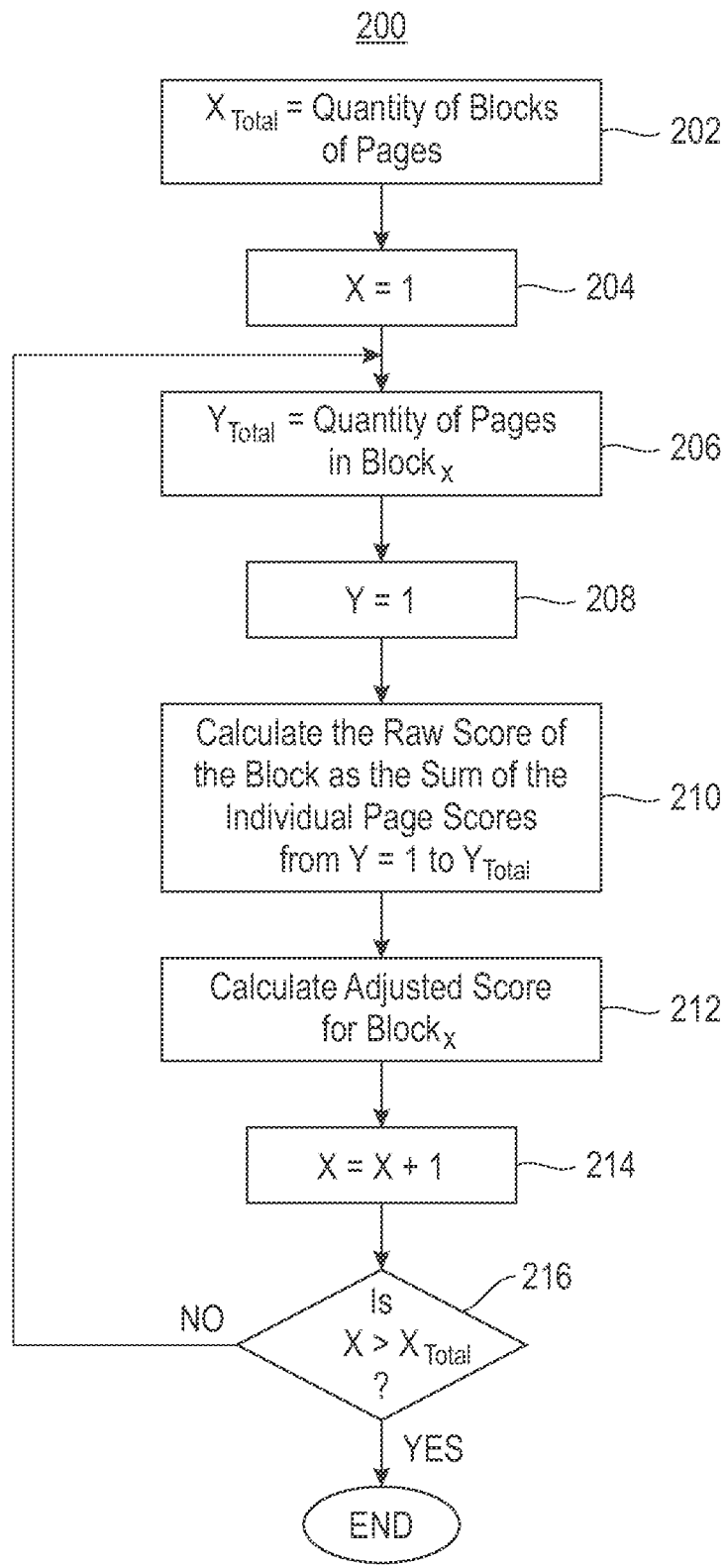
FIG. 2 depicts a flow chart illustrating a process for ranking blocks of pages.

Calculating and applying a score to blocks of pages so that the blocks may be ranked is complex in comparison to scoring and ranking individual pages. Referring to FIG. 2, a flow chart (200) is provided illustrating a process for ranking blocks of pages. The process is performed assuming a specific set of blocks have been selected and will remain selected, and the result of the process is to identify additional blocks that should be added to the set of selected blocks. The process may be performed multiple times, and the first time it is performed the set of selected blocks will generally be an empty set. As shown, a block variable, $X_{Total}$, is assigned to the quantity of blocks of pages (202) not already contained in the selected set, and an associated block counting variable is initialized (204). Each block is configured to contain at least two pages. The variable $Y_{Total}$ is assigned to the quantity of pages in $block_X$ (206). In addition, an associated page counting variable Y is initialized (208). A raw score is calculated for each block. More specifically, for each page spanning from the first page to $Y_{Total}$ that is selected for placement in $block_X$, the raw score of the block is calculated as the sum of the individual page scores (210). In one embodiment, an associated block score may have an additional term specific to the block that is separate from the page scores. An adjusted score is calculated for $block_X$ (212). The adjusted score for a block is the difference in an associated benefit metric that results from selecting the block, followed by performing the page selection process, as compared to the benefit metric that results from performing the page selection process without first selecting the block. The set of selected blocks assumed on beginning the process of FIG. 2 determines in step (120) of the page selection process the set of pages not in the selected blocks and therefore eligible for page selection. Consequently the adjusted score for a block may be different according to which other blocks are in the initially selected set. More specifically, in one embodiment, the adjusted score is computed by starting with the raw score and decreasing the raw score by discounting the scores of the pages that would be selected as pages if the blocks in question were not selected. For a mathematical optimization, the adjusted block score is computed by discounting any page scores. In one embodiment, the benefit metric shown and described at step (212) is an estimated value of a given selection of block for placement in the storage tier. Following step (212), the block counting variable is incremented (214), followed by determining if all of the blocks have been assessed. A negative response is followed by a return to step (206), and a positive response concludes the block assessment process. More specifically, once all of the blocks have been assessed, that blocks are ranked based on the adjusted block scores.

As shown and described, the raw score for a block is the sum of the raw score of each page. Adjustment of the raw score addresses specific page selections within the block and external to the block. The following is an example of application of a raw score adjustment. In this example, $block_A$ is the block in questions and $block_A$ contains a high-score $page_X$. When $block_A$ is selected, the page selection process includes $page_Y$ separate from the block selection. However, when $block_A$ is not selected, the page selection process includes $page_X$ but does not include $page_Y$. More specifically, $page_Y$ must be de-selected in order to select $page_X$. In this example, $page_X$ is the only 'high' score page in or associated with $block_A$. The net value of selecting $block_A$ is the raw score of $block_A$ plus the page score of $page_Y$ and less the page score of $page_X$. A rephrase is that the adjusted score of $block_A$ is its raw score less the discount on $page_X$ equal to the difference between the page score of $page_X$ and the page score of $page_Y$.

The computation of an adjusted block score does not require that the actual page selection procedure be performed. Rather, the computation may be based on a model of the page selection, which indicates which of the pages in the block in question would be selected if the actual page selection procedure were performed. In one embodiment, the modeling is based on the identity and associated score of the relevant pages. The page selection process depends on the context of which blocks are selected. To reflect this dependence, the page selection model may be parameterized, with the parameter being page selection value. In one embodiment, the behavior of the page selection process is to select all pages whose value exceeds the page selection value, to leave unselected all pages whose value is less than the page selection value, and to select all, some, or none of the pages whose value is equal to the page selection value, according to the number of pages to be selected. In such an embodiment the adjusted score of a block is the sum for all its pages of the lesser of the specified page's value and the page selection value parameter. The adjusted score of each block is in this way a function of the page parameter. When applying the process of FIG. 2 with a specific known set of selected blocks, the parameter for the page selection model can be determined by performing the page selection procedure of FIG. 1 once without selecting any additional blocks by selecting the required number of pages strictly according to their value. Then the page selection value parameter is a value less than or equal to the smallest page value of selected pages and greater than or equal to the highest page value of non-selected pages. After so doing the identity of which pages were selected may be discarded, whereas the page selection value is used to compute adjusted block scores of blocks.

Assessment of blocks and pages is dynamic. As pages and/or blocks are accessed, the score is subject to change. The assessment shown and described in FIG. 2 may take place on a periodic basis to enable the score(s) to be current, or in one embodiment, may be dynamically re-assessed as a background process so that the associated scores are updated and accurate in real-time.

Figure 3:
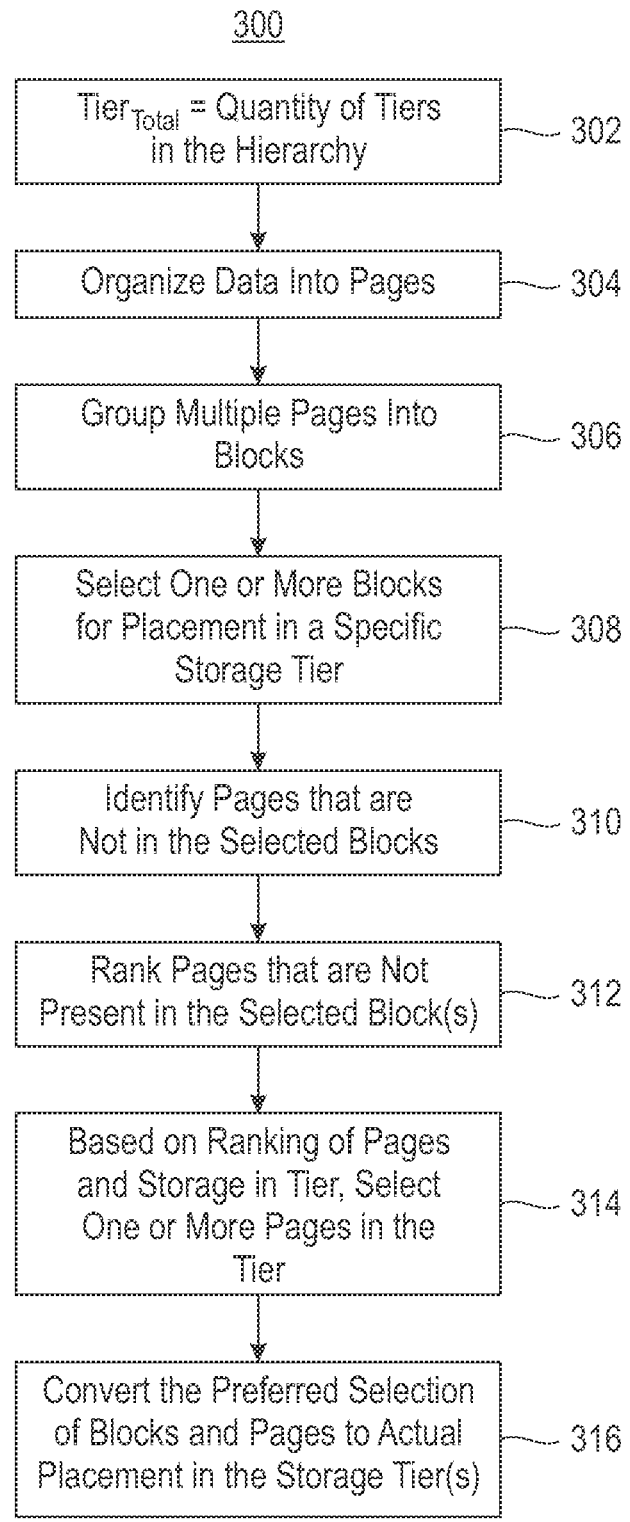
FIG. 3 depicts a flow chart illustrating a page selection process in view of block selection.

Referring to FIG. 3, a flow chart (300) is provided illustrating a page selection process in view of block selection. As shown, the storage system is organized into a hierarchy and segregated into tiers, with each tier reflecting characteristics of the associated storage. The variable $Tier_{Total}$ is assigned to the quantity of tiers in the hierarchy (302). Since the storage system is organized as a hierarchy, there is a minimum of two tiers. In one embodiment, there may be additional tiers in the hierarchy. At the same time, data is organized into pages (304) and multiple pages are grouped into blocks (306). One or more blocks are selected for placement in a specific storage tier (308). The block selection may be based on a variety of factors, including but not limited to, the block benefit metric as assessed at step (212), pages within the selected block, and access frequency associated with the pages. Once the blocks or blocks have been selected, pages that are not in the selected blocks are identified (310). It is understood that following the block selection process, the storage tier may have space for an additional block(s) or one or more pages. To efficiently utilize the space in the subject storage tier, the pages that are not present in the selected block(s) are ranked (312). The benefit metric as shown and described at step (212) may be expanded to include the page selection, so that the metric reflects a given selection of blocks and pages for placement in the higher storage tier. In one embodiment, the estimated benefit metric is a sum of the block scores of selected block, together with the page scores for selected pages not contained in the blocks. Similarly, in one embodiment, the pages scores include a prediction of an access frequency for the selected pages. The prediction may be based on past accesses and/or a relationship of the page to the block selection. More specifically, the preferred and actual placement of the blocks and pages in the storage tier employs for the associated benefit metric, which in one embodiment incorporates the calculated scores.

As explained above, various tools and associated methodologies may be employed to rank the individual pages. Based on both the available space in the storage tier and the ranking of the pages, one or more pages are selected for placement in the tier (314). In one embodiment, the pages with the highest ranking score(s) and/or highest adjusted score are selected. In another embodiment, an alternative page characteristic is utilized for ranking and/or selection. The available space constraint shown and described at step (314) addresses the limited storage space in the associated storage tier. The preferred selection of blocks and pages is converted to actual placement in the storage tier(s) (316). This step comprises placing the selected blocks and pages in the storage tier, and removing from the storage tier any blocks and pages previously placed there but not currently selected for placement in the tier. In an embodiment, the selection is strictly adhered to. In another embodiment, the selection is approximately adhered to but a small number of exceptions are allowed. A maximum number of blocks and pages, e.g. combination of blocks and pages, may be selected and placed in the associated storage tier, with the limitation being the available capacity of the storage tier. As shown and described in FIG. 2, the scores may be updated in real-time. The ranking of blocks and pages at step (312) may incorporate the updated scores, so that changes to placement of the blocks and pages may take place based on the re-assessment. Accordingly, the process of page selection is based on pages that are not present in a selected block, available space in the storage tier, and the scoring of the available pages.

As shown and described in FIG. 3, both blocks and pages are selected for placement in a storage tier. The page selection procedure generally depends on the context of which blocks are selected for placement. To reflect this dependence, the page selection process may be parameterized with a parameter variable. As shown and described in FIG. 2, each block has an adjusted score which is a function of the block parameters and pages assigned to the block. In one embodiment, the selection of blocks, as shown and described in FIG. 3, performs a search over the parameter space by visiting parameter points, with each parameter point specifying the value of each parameter. At each parameter point visited, the procedure evaluates the characteristics of the optimal block selection as constrained by that parameter value. The evaluation takes place using the adjusted block score values for that parameter point. In one embodiment, a complete selection of blocks and pages may be tabulated. Similarly, in one embodiment, the evaluation at a parameter point is sufficient to determine whether the search should stop or continue.

Figure 4:
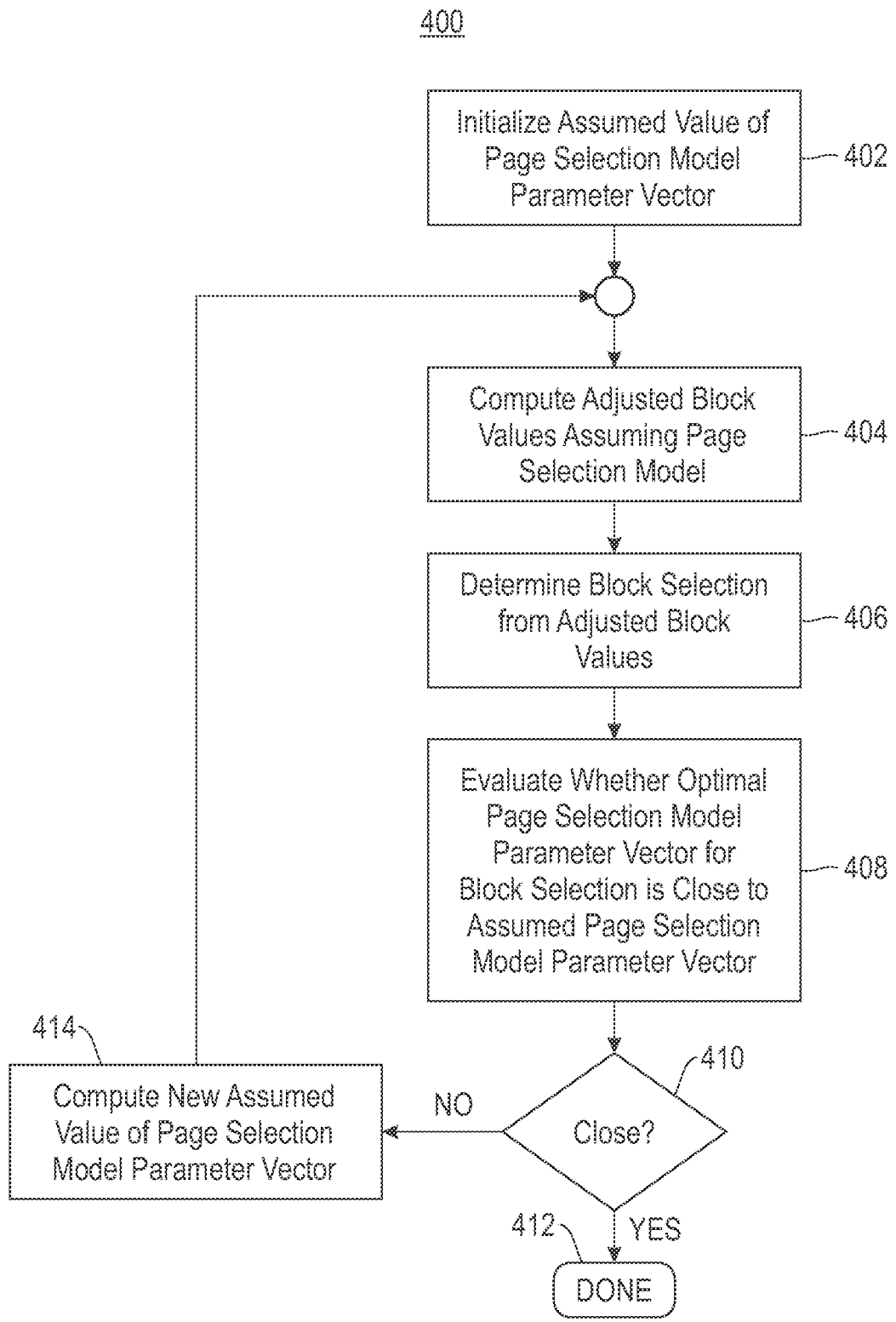
FIG. 4 depicts a flow chart illustrating a process for performing a search over a page selection value as a parameter.

Referring to FIG. 4, a flow chart (400) is provided illustrating a process for performing a search over a page selection value as a parameter. As shown, an assumed value of a patent selection model parameter vector is initialized (402). Adjusted block values are computed using the page selection model with a first page selection value as the parameter value (404). Then, a block selection is determined from the computer adjusted block values (406). More specifically, at step (406) the specified number of blocks with the highest block values is selected. Using the set of selected blocks, a second page selection value is computed by performing the page selection procedure of FIG. 1 and determining the boundary between selected and unselected pages (408), and it is determined if the first and second page selection values are sufficiently close (410). If the first page selection value and second page selection value are sufficiently close then the combination of block selections and page selections is sufficiently close to optimal and the search is stopped (412). Otherwise a third page selection value intermediate between the first and second page selection values is selected as the parameter value (414) for another iteration of the search step, as demonstrated by a return to step (404). In an embodiment, the history of parameters values is used to place upper and lower bounds on the values used for future search steps.

Figure 5:
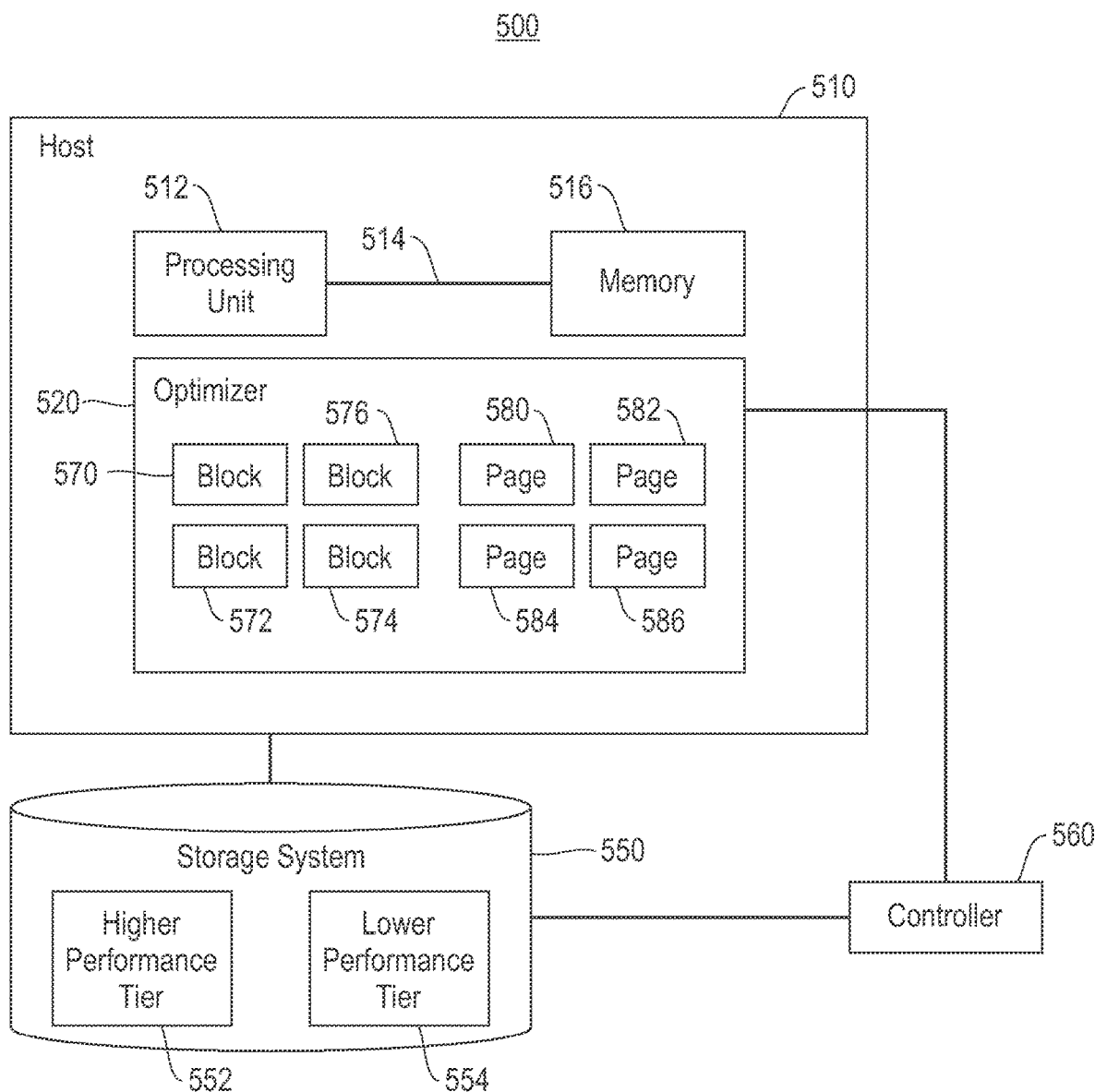
FIG. 5 depicts a block diagram illustrating a computer system and an associated placement optimizer.

The selection and placement may take place in different forms. Referring to FIG. 5, a block diagram (500) is provided of a computer system and an associated placement optimizer. As shown, the system includes a host (510) in communication with a storage system (550). The host (510) is shown with a processing unit (512) operatively coupled to memory (516) across a bus (514). The host (510) is operatively coupled to the storage system (550). The storage system (550) is shown operatively coupled to a controller (560). More specifically, the storage system (550) is shown organized and configured into a hierarchy of storage tiers. In the example shown herein, there are two storage tiers (552) and (554), although in one embodiment, additional tiers may be provided in the storage hierarchy. The tiers are ranked with respect to speed and cost per storage unit. In the example shown herein, tier (552) relates to a faster and more expensive device, such as a SSD than that shown in tier (554), such as a HDD. In one embodiment, the controller (560) is responsible for organizing and ranking the storage tier (552) and (554). Tier (552) is referred to as the higher performance tier and tier (554) is referred to as the lower performance tier.

The host (510) is shown with an optimizer (520) in communication with the controller (560). The optimizer (520) functions to select and place pages and blocks into tier (552) in a combination of page and block granularity. As shown, there are multiple data blocks (570), (572), (574), and (576), and multiple pages (580), (582), (584), and (586). The quantity of blocks and pages shown herein should not be considered limiting, as they are for descriptive purposes. Furthermore, in the example shown herein, the pages (580)-(586) represent pages that are not placed into any of blocks (570)-(576). The optimizer (520) may function dynamically to periodically determine threshold values for the optimization. For example, a threshold value may be employed for page selection. The optimizer (520) utilizes the threshold to perform incremental placement changes in real-time with reference to the threshold value. For example, the score assigned to one or more pages may be subject to change based on changes to frequency of access. In one embodiment, one page may have an increased frequency in a set time period, while another page has a decrease in frequency of access. These changes affect their respective scores. More specifically, the scores are dynamic. As any one of the pages is accessed, the score is re-evaluated, and the optimizer (520) performs placement changes based on the re-evaluation. In one embodiment, the placement changes are incremental. In one embodiment, the optimizer (520) may be remote from the host (510). Accordingly, the optimizer functions in conjunction with the data storage and the defined tiers for placement of blocks and pages into specific tiers in the hierarchical arrangement.

Figure 6:
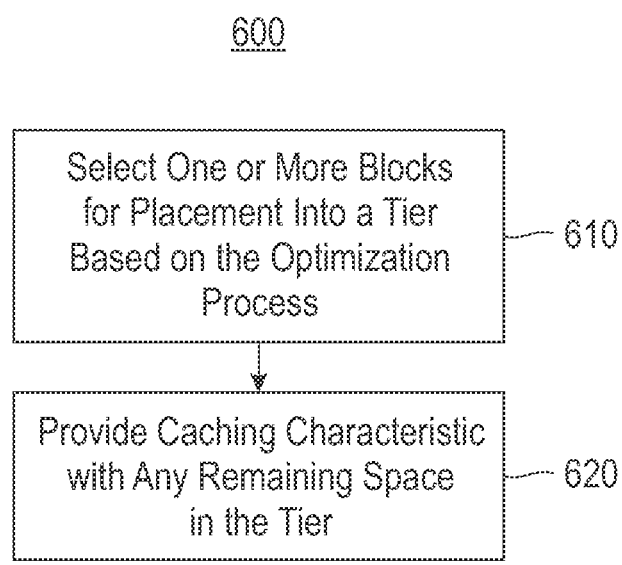
FIG. 6 depicts a flow chart illustrating the combination of block selection and page caching.

The placement of data storage into multiple tiers may function on a block granularity with a semi-autonomous page granular cache. Referring to FIG. 6, a flow chart (600) is provided illustrating the combination of the block selection and the page caching. As shown, one or more blocks are selected for placement into a tier based on the optimization process (610), as shown and described in FIG. 3. At the same time, any remaining space in the tier is provided a caching characteristic (620). More specifically, the remaining space in the tier accommodates and receives pages in a similar manner as cache memory with the space reserved for high speed access to select pages. In one embodiment, the remaining space in the tier is driven by on-demand caching without regard for the optimization results. Accordingly, the space remaining in the storage tier after placement of one or more blocks (or pages) may be treated as cache for accommodation of any additional blocks or pages.

Selection and placement of blocks and pages in the tiered storage system may be expressed as a mathematical optimization problem that models aspects of the above-described block and page selection problem, as well as a fast algorithm for solving the mathematical optimization problem to provide an optimal selection of blocks and pages to be placed in a faster tier within the storage hierarchy. More specifically, a method is provided for converting parameters of the system and results of the measurements into actions that improve performance and operating efficiency. In an embodiment, the number of blocks to be selected and the number of pages to be selected are subject to separate limits. The problem formulation in such an embodiment is expressed with P referencing the number of pages contained in a single block, with p referencing the maximum number of pages selected, and with b referencing the maximum number of blocks selected.

The optimization problem is expressed as follows:

$$\text{Maximize} \left( \sum_{i=1}^{n} c_i x_i + \sum_{i=1}^{n} \sum_{j=1}^{P} d_{ij} y_{ij} \right) \text{ subject to}$$

$$\left( \sum_{i=1}^{n} \sum_{j=1}^{P} y_{ij} \le p \right)$$

$$\left( \sum_{i=1}^{n} x_i \le b \right)$$

$$x_i + y_{ij} \le 1 \ (i = 1, \ldots, n, j = 1, \ldots, P)$$

$$\{x_i, y_{ij}\} \subseteq \{0, 1\} \ (i = 1, \ldots n, j = 1, \ldots, P)$$

In another embodiment, it is possible for the same space resource to be used to store either individual pages or blocks or a combination of pages and blocks on the high performance tier, according to what is determined by the placement optimization procedure. In such an embodiment it is not necessary to place separate limits p on the maximum number of pages and b on the maximum number of blocks. Instead there is a limit C on the total space used to store both blocks and pages. For such an embodiment the unit of measurement of storage space is chosen so that it takes one unit of storage to store a single page when this page is not part of a stored block, e.g. the page is stored as an individual unit. The variable s denotes the number of units of storage it takes to store on block, e.g. each block having at least two pages. The following assumptions and definitions are made:

$1 < s < P;$ s is an integer;

$P \geq 3;$ and

C is the number of available storage units.

The optimization problem for such an embodiment is expressed as follows:

$$\text{Maximize} \left( \sum_{i=1}^{n} c_i x_i + \sum_{i=1}^{n} \sum_{j=1}^{P} d_{ij} y_{ij} \right) \text{ subject to}$$

$$\left( s \cdot \sum_{i=1}^{n} x_i + \sum_{i=1}^{n} \sum_{j=1}^{P} y_{ij} \leq C \right)$$

$$x_i + y_{ij} \leq 1 \ (i = 1, \ldots, n, j = 1, \ldots, P)$$

$$\{x_{ij}, y_{ij}\} \subseteq \{0, 1\} \ (i = 1, \ldots n, j = 1, \ldots, P)$$

The focus of the optimization problem is to maximize the total benefit of the storage including the benefits associated with storage of data blocks and the benefits of storage of data pages. At the same time, the benefits of storage are subject to the cost of storage in both a block basis and a page basis. One significant constraint in the optimization is that if data is stored as a block it is not also separately stored as a page. In other words, in the placement variables $x_i$ and $y_{ij}$ of the optimization problem, a page cannot be assigned to be stored both as a block and as a page. In some embodiments the placement operations of steps (314) and (316) of FIG. 3 are not required to adhere strictly to the computed optimal placement, so the actual placement might not conform in all cases to the constraint. The input of the problem amounts to the formulation with the additional requirements that the number of selected blocks must be equal to a given number, b, and the number of additionally selected pages must be equal to a given number, p. The goal of the problem is to select b blocks $i_1, \ldots, i_b$ and p pages $(k_1, j_1), \ldots, (k_p, j_p)$ such that $\{i_1, \ldots, i_b\} \cap \{k_1 \ldots, k_p\} = 0$, where k represents the supply of blocks and j represents the supply of pages, so as to maximize the total value of the selected blocks and pages:

$$\sum_{l=1}^{b} c_{il} + \sum_{l=1}^{p} d_{k_l j_l}.$$

As described in connection with FIG. 2, the procedure of optimizing the value expressions while adhering to the constraints may include performing a block selection step based on adjusted block scores computed using a parameterized page selection model. In an embodiment the page selection model is parameterized using the page selection value μ where the page selection variables $y_{ij}$ have the properties $y_{ij} = 0$ if $d_{ij} \leq \mu$ $y_{ij} = 1 - x_i$ if $d_{ij} > \mu$ The formulation of the problem and goals is converted into an action in the form of selection of blocks and pages within the hierarchical storage structure that improves performance. As shown in the above-described figures, the block selection step followed by the page selection steps enables frequently access data represented in pages and blocks to be placed in a higher ranked tier. More specifically, the conversion of the formulation to implementation takes placed in the assignment(s) of scores to the blocks and pages, and the associated ranking of the blocks and pages based on the scores, and converting the ranking to actual block and page placement within the tiered storage system.

The hardware system shown and described above in FIG. 5 has been labeled with tools in the form of an optimizer (520) and a controller (560). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 7:
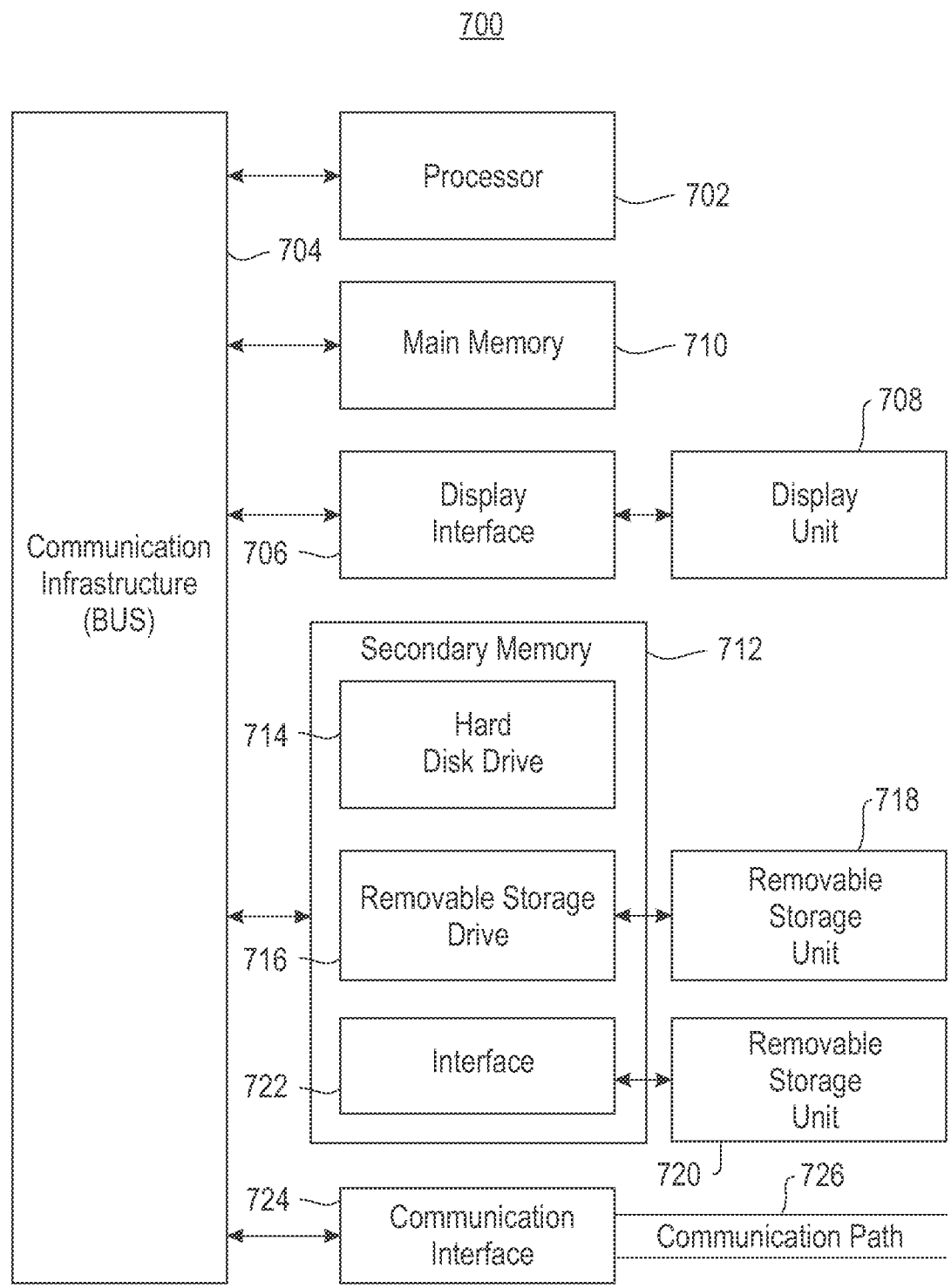
FIG. 7 depicts a computer system for implementing an embodiment of the present invention.

Referring now to the block diagram of FIG. 7, additional details are now described with respect to implementing an embodiment of the present invention. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716).

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of preferred selection, and more specifically, the conversion of the preferred selection to actual placement in the high storage tier accounts for both the benefit, as reflected in the associated block and page scores, and limited capacity of the higher storage tier.

It will be appreciated that, although specific embodiments of the invention have been described herein for purposes of illustration, various modifications may be made without departing from the spirit and scope of the invention. In particular, the process of selection based on scores may be implemented in real-time so that any changes to the selected blocks and pages reflect current block and pages score values. Accordingly, the scope of protection of this invention is limited only by the following claims and their equivalents.

We claim:

1. A method comprising:
configuring a storage system into a hierarchy of storage tiers, including a first performance storage tier and a second performance storage tier;
determining a resource constraint limiting a number of blocks and number of individual pages for selection and placement into the first performance storage tier, wherein the selection and placement are a combination of individual page and block granularity, and a block comprises at least two pages;
estimating a benefit metric as a value of a given selection of blocks and individual pages for placement in the first performance storage tier, the benefit metric including a sum of block scores of selected blocks, and individual page scores for selected individual pages not contained in the selected blocks;
determining a preferred selection of a first combination of blocks and individual pages according to the benefit metric; and
placing the preferred selection of the first combination of blocks and individual pages in the first storage tier with the selection reflecting the preference as determined by the benefit metric.

2. The method of claim 1, wherein the resource constraint includes a maximum number of blocks and a maximum number of individual pages based on memory space available to hold an associated mapping of metadata for individual pages mapped to the first performance storage tier.

3. The method of claim 1, wherein the resource constraint includes a limit on a weighted sum of the number of blocks and the number of pages.

4. The method of claim 1, wherein the individual page scores include a prediction of an access frequency for the selected individual pages.

5. The method of claim 1, further comprising dynamically re-assessing the block scores and the individual page scores based on access, including performing placement changes in the first performance storage tier based on the re-assessment.

6. The method of claim 1, wherein determining the preferred selection further comprising:
a page selection procedure for individual pages; and a block selection procedure, the block selection procedure including, computing an adjusted block score according to a page selection model, and selecting blocks utilizing the adjusted first ranking, wherein any page is selected by only one of: the page selection procedure and the block selection procedure.

7. The method of claim 6, further comprising:
computing an optimal selection as constrained by a parameter of the page selection model, and
performing a search in a parameter space of the page selection model.

8. A computer program product for optimizing performance of tiered storage, the computer program product comprising a computer readable storage medium having program code embodied therewith, the program code executable by a processing unit to:
configure a storage system into a hierarchy of storage tiers, including a first performance storage tier and a second performance storage tier;
determine a resource constraint limiting a number of blocks and number of individual pages for selection and placement into the first performance storage tier, wherein selection and placement are a combination of individual page and block granularity, and a block comprises at least two pages;
estimate a benefit metric as a value of a given selection of blocks and individual pages for placement in the first performance storage tier, the benefit metric includes a sum of block scores of selected blocks, and individual page scores for selected individual pages not contained in the selected blocks;
determine a preferred selection of a first combination of blocks and individual pages according to the benefit metric; and
placing the preferred selection of the first combination of blocks and individual pages in the first storage tier with the selection reflecting the preference as determined by the benefit metric.

9. The computer program product of claim 8, wherein the resource constraint includes a maximum number of blocks and a maximum number of individual pages based on memory space available to hold an associated mapping of metadata for individual pages mapped to the first performance storage tier.

10. The computer program product of claim 8, wherein the resource constraint includes a limit on a weighted sum of the number of blocks and the number of pages.

11. The computer program product of claim 8, wherein the individual page scores include a prediction of an access frequency for the selected individual pages.

12. The computer program product of claim 8, further comprising program code to dynamically re-assess the block scores and the individual page scores based on access, including performing placement changes in the first tier based on the re-assessment.

13. The computer program product of claim 8, wherein the program code to determine the preferred selection further comprising:
a page selection procedure for individual pages; and
a block selection procedure, the block selection procedure including, program code to compute an adjusted block score according to a page selection model, and program code to select blocks with highest adjusted block scores, wherein any page is selected by only one of: the page selection procedure and the block selection procedure.

14. The computer program product of claim 13, further comprising program code to
compute an optimal selection as constrained by a parameter of the page selection model, and
perform a search in a parameter space of the page selection model.

15. A computer system comprising:
a processing unit operatively coupled to memory;
a tool in communication with the processing unit to optimize performance of tiered storage, including:
a controller to configure a storage system into a hierarchy of storage tiers, including a first performance storage tier and a second performance storage tier; and
an optimizer to select and place pages and blocks into one of the tiers in a combination of individual page and block granularity, wherein a block comprises at least two pages, and the selection and placement includes the optimizer which is configured to:
determine a resource constraint limiting a number of blocks and number of individual pages for selection and placement into the first performance storage tier, the benefit metric further comprises a sum of block scores of selected blocks and individual page scores for selected individual pages not contained in the selected blocks;
estimate a benefit metric as a value of a given selection of blocks and individual pages for placement in the first performance storage tier;
determine a preferred selection of a first combination of blocks and individual pages according to the benefit metric; and
place the preferred selection of the first combination of blocks and individual pages in the first storage tier with the selection reflecting the preference as determined by the benefit metric.

16. The system of claim 15, wherein the resource constraint includes a maximum number of blocks and a maximum number of individual pages based on memory space available to hold an associated mapping of metadata for individual pages mapped to the first performance storage tier.

17. The system of claim 15, wherein the individual page scores include a prediction of an access frequency for the selected pages.

18. The system of claim 15, further comprising the optimizer to dynamically re-assess the block scores and the page scores based on access, including the optimizer performing placement changes in the first tier based on the re-assessment.

19. The system of claim 15, wherein the first tier is a high performance tier and the second tier is a lower performance tier.

* * * * *